UNITED STATES PATENT OFFICE.

SAMUEL CRAWFORD WILSON, OF ALPHA, ILLINOIS.

COMPOUND FOR INCREASING THE YIELD OF BUTTER FROM MILK.

SPECIFICATION forming part of Letters Patent No. 489,775, dated January 10, 1893.

Application filed June 7, 1892. Serial No. 435,915. (No specimens.)

*To all whom it may concern:*

Be it known that I, SAMUEL CRAWFORD WILSON, of Alpha, in the county of Henry and State of Illinois, have invented certain new and useful Improvements in Compounds for Increasing the Yield of Butter from a Given Quantity of Milk; and I do hereby declare the following to be a full, clear, and exact description of the invention, such as will enable others skilled in the art to which it pertains to make and use it.

My invention relates to a compound for increasing the yield of butter from a given quantity of milk; and it consists of the ingredients compounded in the manner hereinafter described, and of about the proportions hereinafter specified.

The object of my invention is to provide a compound which is to be mixed with milk, before it is churned in the ordinary manner, whereby the yield of butter from a given quantity of milk is increased, and the churning thereof facilitated.

The compound consists of the following ingredients:—sixty grains of pepsin one hundred and twenty five grains of pulverized gum arabic three and a half ounces of powdered alum. These ingredients are thoroughly mixed and kept tightly stopped in a bottle, to be used before the milk is churned. The ingredients when mixed in the above proportions, are mixed with the milk before it is churned, about from one to three teaspoonfuls to a quart of milk, according to the richness of the milk.

The alum sours the milk, the pepsin digests or separates the cream globules from the milk, and the gum-arabic collects the globules and causes them to stick together.

By mixing the above compound with milk before it is churned, the yield of butter therefrom is greatly increased, and the churning thereof facilitated.

After butter is secured, it is thoroughly cleansed with cold water by washing it in the ordinary manner.

Having thus described my invention, what I claim and desire to secure by Letters Patent is:—

A compound for the purpose described, consisting of pepsin, gum-arabic and alum, substantially as specified.

In testimony whereof I affix my signature in presence of two witnesses.

SAMUEL CRAWFORD WILSON.

Witnesses:
B. Y. WIDNEY,
C. D. STREETER.